UNITED STATES PATENT OFFICE.

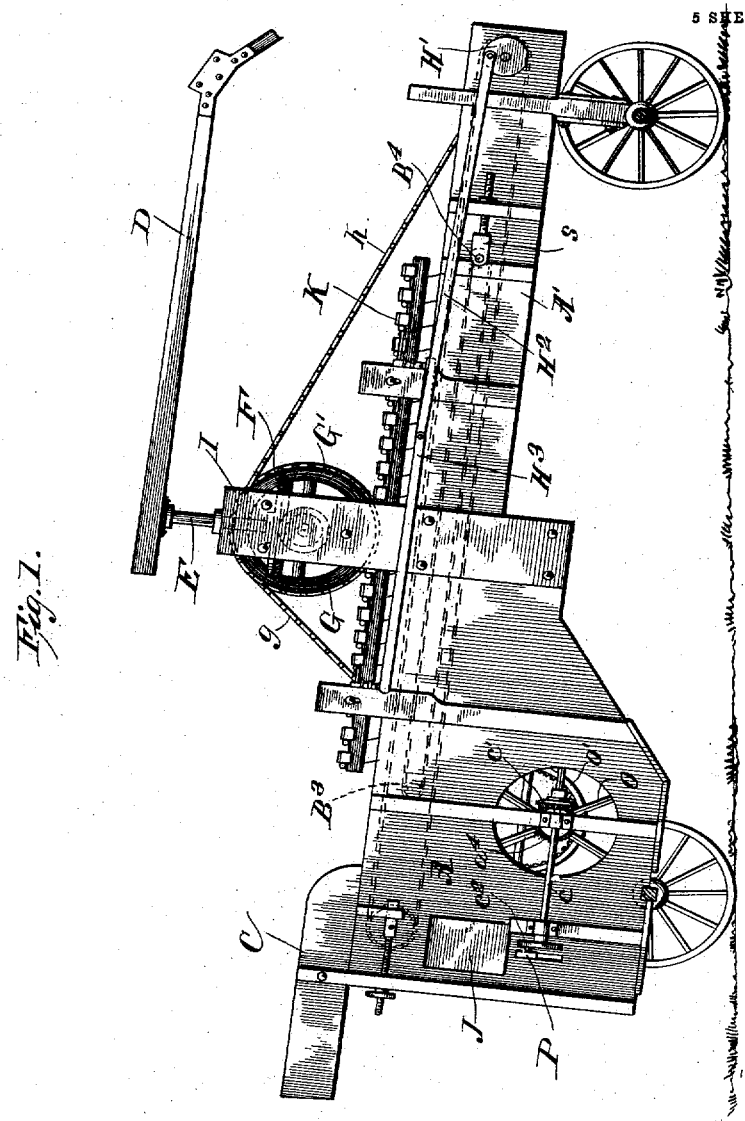

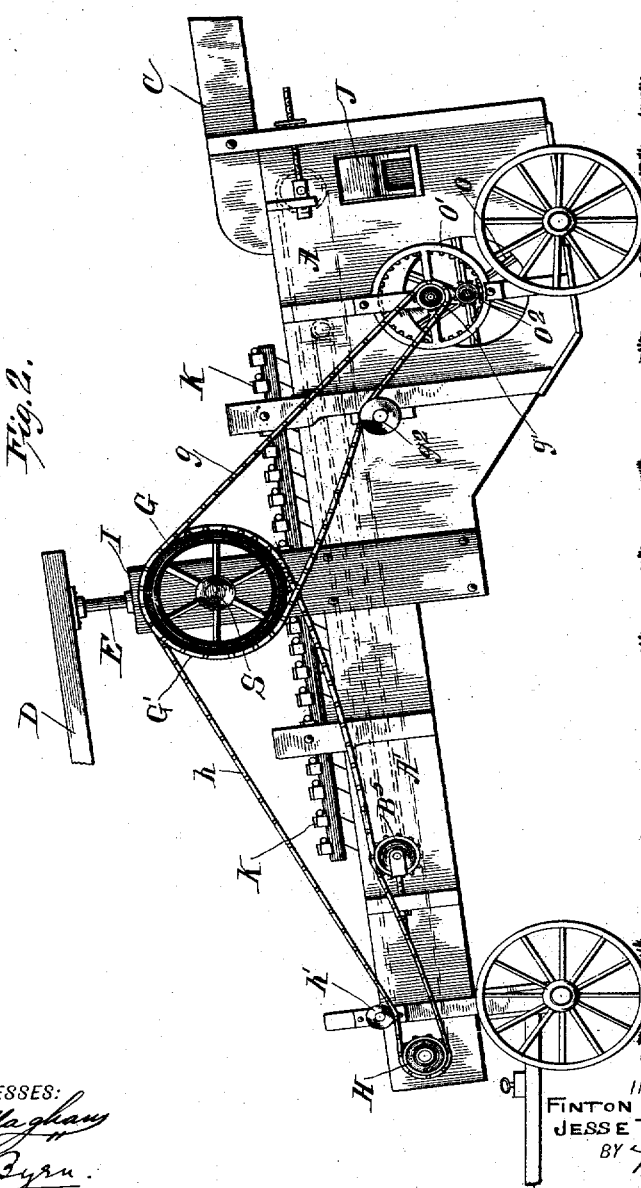

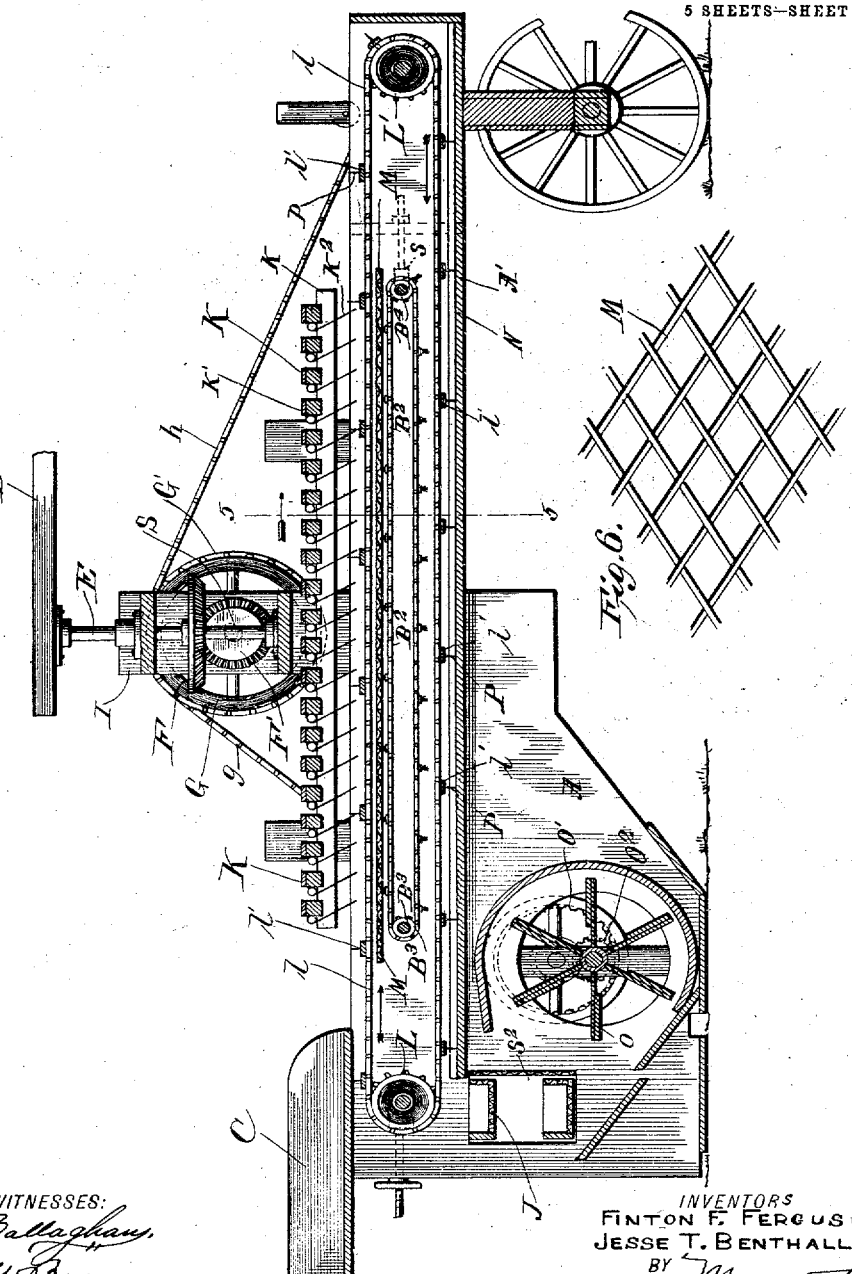

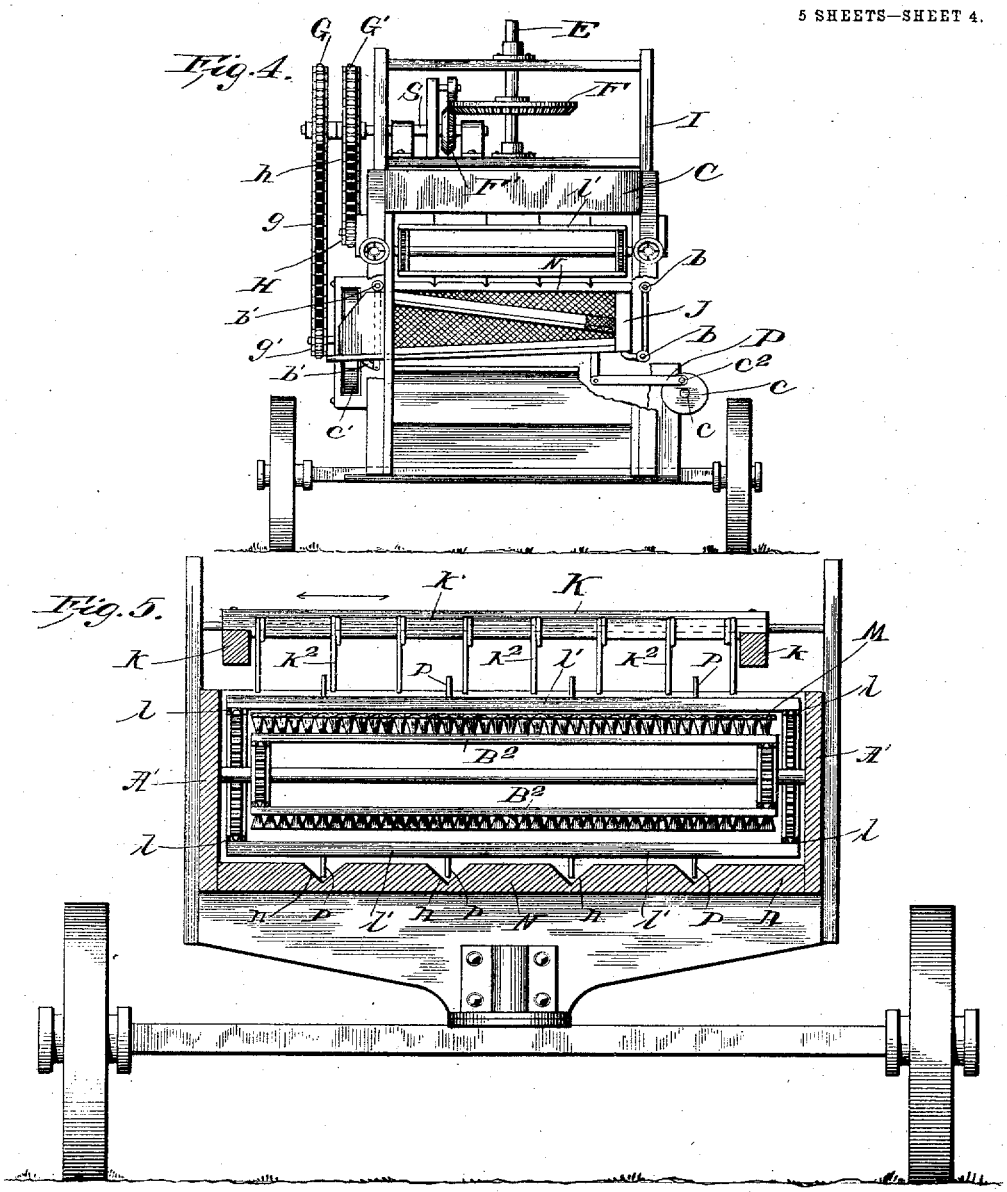

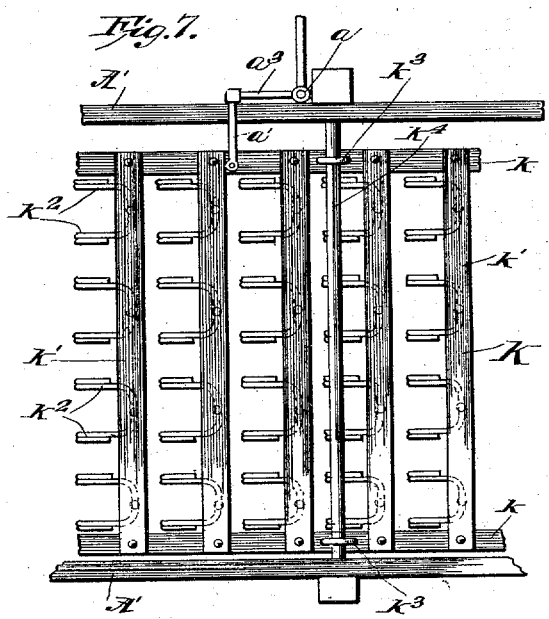
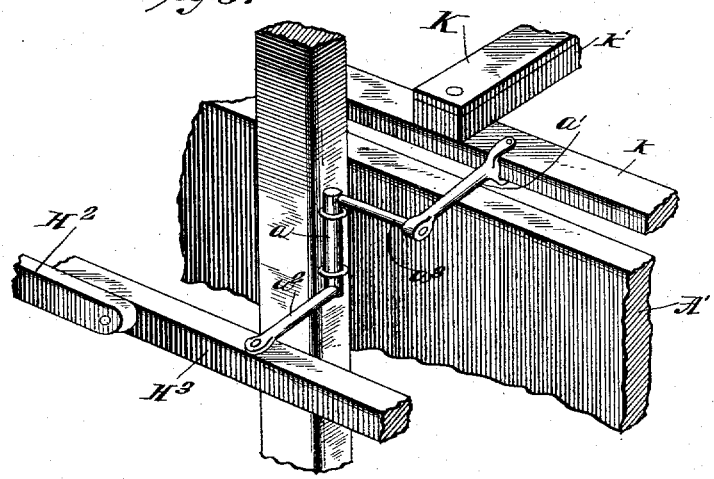

FINTON F. FERGUSON AND JESSE T. BENTHALL, OF MURFREESBORO, NORTH CAROLINA, ASSIGNORS TO RICHARD T. BARNES, OF SUNBEAM, VIRGINIA.

PEANUT-PICKER.

No. 808,442.      Specification of Letters Patent.      Patented Dec. 26, 1905.

Application filed May 17, 1905. Serial No. 260,864.

*To all whom it may concern:*

Be it known that we, FINTON F. FERGUSON and JESSE T. BENTHALL, citizens of the United States, residing at Murfreesboro, in the county of Hertford and State of North Carolina, have invented an Improvement in Peanut-Pickers, of which the following is a specification.

The object of our invention is to provide a machine for rapidly and efficiently picking off the peanuts from the vines and cleaning them.

In harvesting peanuts the vines, with the nuts adhering in clusters, are plowed out of the ground, shaken free of the dirt, and then stacked up. Our machine is designed to take these vines, with their nuts hanging to them, and to pick off the nuts and clean them ready for bagging, while the vines are discharged over the end of the machine in condition to be utilized for cattle-feed.

Our invention consists in the novel construction and arrangement of devices for accomplishing the above results, which we will now proceed to describe with reference to the drawings, in which—

Figure 1 is a side elevation with the machine in position for transportation. Fig. 2 is a side elevation from the opposite side. Fig. 3 is a vertical longitudinal section on a somewhat larger scale than Figs. 1 and 2, showing one pair of wheels removed and one end of the machine resting firmly on the ground, as when the machine is at work. Fig. 4 is a rear end elevation. Fig. 5 is an enlarged vertical cross-section taken on line 5 5 of Fig. 3. Fig. 6 is a partial plan view of the picking-screen. Fig. 7 is a partial plan view of the stirring device for working the nuts through into the picking-screen. Fig. 8 is a detail in perspective of the mechanism for agitating the stirring device.

Referring to Figs. 1 and 2, A A' is the casing of the machine, which is mounted upon wheels and is provided with a tongue and draft attachment for a team for transportation. The rear part A of the casing is much deeper than the forward part for the purpose hereinafter described. About the middle portion of the casing is erected an upright frame I, in which is journaled in bearings a vertical shaft E, having rigidly attached to its upper end a rotary sweep D, which is in the nature of a long arm bent or made in sections and extending downwardly, so as to swing around the entire machine. To the lower end of this arm is attached the team, which when driven around the machine furnishes the power for operating the working parts of the machine. The vertical shaft E (see Fig. 3) has rigidly attached to it within the frame I a bevel gear-wheel F, which meshes with a smaller bevel-gear F' on a horizontal shaft S, bearing outside of the frame I two rigidly-attached sprocket-wheels G G', Figs. 2 and 4, placed side by side. One of these wheels G transmits power through a chain belt $g$ to a small sprocket-wheel $g'$ on the same shaft with a larger gear-wheel O', Figs. 2 and 3, which has inwardly-projecting teeth that engage and drive a pinion $O^2$ on the shaft of a rotary fan O. A belt-tightener pulley $g^2$, Fig. 2, serves to take up slack in the chain belt $g$. The other sprocket-wheel G' is connected by chain belt $h$ to a sprocket-wheel H at the forward end of the machine. A belt-tightener pulley $h'$ takes up slack in the belt $h$.

C is a hopper into which the peanut-vines, with the adhering nuts, are fed. The vines and nuts are separated by devices presently to be described, and the vines are delivered toward the right-hand end of Fig. 3 over the forward end of the machine onto the ground, while the separated and cleaned nuts pass through the cleaning-fan and out through the side chute J of a shaking-shoe.

The picking devices for separating the nuts from the vines are best shown in Figs. 3, 5, and 7, in which L and L' are sprocket-wheels distending a carrier-belt consisting of two chains $l$, connected by cross-bars $l'$, having pointed pins $p$ about an inch long projecting from the cross-bars. Just above the upper run of the belt is a frame K, which has a reciprocating motion at right angles to the run of the belt. This frame has side bars $k$, connected by cross-bars $k'$, and these cross-bars have spring-teeth $k^2$, which are made in pairs with the wire bent into U shape, clamped between the bars $k'$, with the ends coiled, and then extended downwardly and forwardly in the direction of the travel of the carrier-belt, as seen in Figs. 3 and 7. Just below the upper run of the carrier-belt is a stationary picking-screen M, composed of stout wire with meshes about three inches long and of a diamond shape, as seen in Fig. 6, with the longitudinal axis of the diamond parallel to the run of the belt. This picking-screen is at its side edges fixed to the main frame, and its function is to catch the nuts in its acute angles as they drop down through the meshes while being carried forward by the carrier-belt and are thus pulled off the vines and drop down through the lower run of the belt onto the floor N, on which the lower run of the belt moves. This floor has longitudinal grooves $n$, in which the pins $p$ of the carrier-belt run, as seen in Fig. 5. From this floor the nuts are swept off to the rear by the cross-bars $l'$ of the carrier and are delivered to the shaking-shoe of the fan, as hereinafter described. When the peanut-vines are thrown into the hopper C, they are received upon the top of the carrier and are dragged by it underneath the stirring-frame K, which has a lateral reciprocation. This motion of the frame causes its spring-teeth to spread and distribute the vines across the carrier in a more or less thin layer and works the peanuts down so that they hang down while still on the vines and pass through the diamond-shaped meshes of the picker-screen M, and as this is stationary while the vines are dragged forwardly by the carrier it will be seen that the nuts are surely torn off and drop down. This action is made certain by the weight of nuts, which causes them to drop through the meshes and insures their catching and hanging in the wire mesh with sufficient resistance to be torn off.

To impart the lateral reciprocation to the stirring-frame K, it is mounted (see Fig. 7) by guides $k^3$ on cross-shafts $k^4$, so as to move freely and is connected (see Fig. 8) by horizontal arms $a'$ to crank-arms $a^3$ on the upper ends of the short vertical rock-shafts $a$, and at the lower ends of these rock-shafts there are other arms $a^2$ at right angles to those above. These lower arms are loosely connected to a horizontal reciprocating bar $H^3$, arranged beside the machine and parallel with it. This bar $H^3$ is connected to a pitman $H^2$, which (see Fig. 1) in turn is connected to a crank-pin on the wheel $H'$, which is keyed on the shaft of the front sprocket-wheels. As the wheel $H'$ turns the pitman $H^2$ causes bar $H^3$ to reciprocate, and through the rock-shaft $a$ and arms $a^3$ and $a^2$ the stirring-frame K is moved sidewise.

It has been found that the acute angles of the diamond-shaped mesh of the picking-screen M are liable after a time to become wedged or clogged with dirt and particles of the vines, so that the acute angles become so rounded as to fail to hold and pick off the nuts, allowing many of them to pass out with the vines. To prevent this, the under side of the screen is constantly brushed clean by a brush-belt $B^2$, Figs. 3 and 5, formed by chains with cross-slats bearing cleaning-bristles. This brush-belt passes around sprocket-wheels $B^3$ $B^4$ and has a tension-regulating device $s$. It is driven by a sprocket-wheel $B^5$ on the end of one of its shafts, which wheel $B^5$ receives motion from the chain belt $h$, as seen in Fig. 2.

The shoe J consists of two wire screen troughs connected together (see Figs. 3 and 4) and arranged transversely to the machine. The upper trough inclines downwardly to one side and discharges into the upper end of the lower trough, which inclines in the other direction and emerges from the side of the machine, as seen in Fig. 2. This shoe has on the side next to the fan a wire screen $s^2$, Fig. 3, through which the blast of air from the fan passes, but which screen prevents the nuts and trash from falling out of that side of the shoe. This shoe is sustained upon hanger-bars $b$ $b$ and $b'$ $b'$ and is shaken by the fan-shaft through a rod P, (see Figs. 1 and 4,) which at one end carries a crank-pin $c^2$ on the end of an outside longitudinally-arranged shaft $c$, which shaft at its other end bears a bevel gear-wheel $c'$, that meshes with and receives motion from another bevel-gear $a^4$ on the fan-shaft.

It will be seen that when the machine is mounted on the four wheels B for transportation, as in Figs. 1 and 2, the rear end is higher than the front end. When, however, the machine is to be worked, the rear wheels are taken off and the rear end of the casing then sets firmly on the ground, as in Fig. 3, and the picker screens and carrier-belt are brought to a level position. This also holds the whole machine in a very rigid position against the torsional strain of the revolving sweep and prevents the rocking of the machine on its axles.

In making use of our invention we do not confine ourselves to the special construction and arrangement of parts shown, as these may be varied in many particulars without departing from our invention. Thus, for instance, instead of running the machine by a team attached to the sweep it may be run by steam or other power suitably belted or geared to the main shaft. We furthermore do not limit our invention to the gathering of peanuts, as it is obviously adapted to the picking of any kind of peas, beans, pods, or berries from the vines bearing the same when such vines are cut off with the crop to be harvested.

Having thus described our invention, what we claim as new, and desire to secure by Letters Patent, is—

1. A picking-machine for picking nuts, &c., from the vines, consisting of a stationary picking-screen for catching and holding the nuts, combined with a carrier-belt for dragging the vines over the screen and a stirring device consisting of a horizontally-reciprocating frame with downwardly-projecting spring-fingers arranged above the carrier-belt to spread the vines and work the nuts through the screen.

2. In a picking-machine, the stirring device consisting of a frame bearing downwardly-projecting fingers, combined with a subjacent carrier and a subjacent picking-screen, the stirring device being provided with means for imparting a lateral motion to the same.

3. A machine for picking nuts, pods, &c., from vines, comprising a carrier-belt for the vines, a screen arranged beneath the upper run of the belt to tear off the nuts and a subjacent cleaner for said screen.

4. A machine for picking nuts, pods, &c., from vines, comprising a carrier for the vines, a picking-screen arranged below the carrier through which the nuts may drop while still adhering to the vines and a movable brush below the screen to clean the same.

5. A machine for picking nuts, pods, &c., from vines, comprising a carrier for the vines, a picking-screen arranged below the carrier, a movable cleaner below the screen and a stirring device arranged above the carrier to work the nuts through the screen.

6. A machine for picking nuts, pods, &c., from vines, comprising a carrier for the vines, a picking-screen arranged below the carrier, a movable cleaner below the screen, a stirring device arranged above the carrier to work the nuts through the screen and a fan and shaking-shoe for cleaning the nuts.

7. A picking-machine for picking nuts, pods, &c., from the vines, comprising a set of picking devices having at one end a fan and shaking-shoe, a vertical driving-shaft with sweep-arm for turning it, wheels supporting the picking and cleaning devices in a position inclined to the horizontal, the tread of the wheels supporting the end of the picking devices opposite the fan being substantially the same distance from the picking devices as the bottom of the fan-case, whereby the bottom of said fan-case when resting upon the ground brings the picking devices horizontal and firm as against the operating strain.

8. A machine for picking nuts, pods, &c., from vines, comprising an endless carrier for the vines, a picking-screen arranged below the upper run of the carrier, an endless brush-belt arranged within the endless carrier below the picking-screen, distending and driving rolls for the endless brush-belt and means for regulating the tension of the brush-belt, substantially as described.

FINTON F. FERGUSON.
JESSE T. BENTHALL.

Witnesses:
E. B. HILL,
JOHN B. TRADER.

---

Correction in Letters Patent No. 808,442.

It is hereby certified that Letters Patent No. 808,442, granted December 26, 1905, upon the application of Finton F. Ferguson and Jesse T. Benthall, of Murfreesboro, North Carolina, for an improvement in "Peanut-Pickers," was erroneously issued to Richard T. Barnes, as owner of the entire interest in said invention; that said Letters Patent should have been issued to the inventor Jesse T. Benthall and Richard T. Barnes, *jointly*, said Richard T. Barnes being the assignee of Finton F. Ferguson's one-half interest only in said patent as shown by the record of assignment in this office; and that the said Letters Patent should be read with this correction therein that the same may conform to the record of the case in the Patent Office.

Signed and sealed this 16th day of January, A. D., 1906.

[SEAL.]

F. I. ALLEN,
Commissioner of Patents.

wardly-projecting fingers, combined with a subjacent carrier and a subjacent picking-screen, the stirring device being provided with means for imparting a lateral motion to the same.

3. A machine for picking nuts, pods, &c., from vines, comprising a carrier-belt for the vines, a screen arranged beneath the upper run of the belt to tear off the nuts and a subjacent cleaner for said screen.

4. A machine for picking nuts, pods, &c., from vines, comprising a carrier for the vines, a picking-screen arranged below the carrier through which the nuts may drop while still adhering to the vines and a movable brush below the screen to clean the same.

5. A machine for picking nuts, pods, &c., from vines, comprising a carrier for the vines, a picking-screen arranged below the carrier, a movable cleaner below the screen and a stirring device arranged above the carrier to work the nuts through the screen.

6. A machine for picking nuts, pods, &c., from vines, comprising a carrier for the vines, a picking-screen arranged below the carrier, a movable cleaner below the screen, a stirring device arranged above the carrier to work the nuts through the screen and a fan and shaking-shoe for cleaning the nuts.

7. A picking-machine for picking nuts, pods, &c., from the vines, comprising a set of picking devices having at one end a fan and shaking-shoe, a vertical driving-shaft with sweep-arm for turning it, wheels supporting the picking and cleaning devices in a position inclined to the horizontal, the tread of the wheels supporting the end of the picking devices opposite the fan being substantially the same distance from the picking devices as the bottom of the fan-case, whereby the bottom of said fan-case when resting upon the ground brings the picking devices horizontal and firm as against the operating strain.

8. A machine for picking nuts, pods, &c., from vines, comprising an endless carrier for the vines, a picking-screen arranged below the upper run of the carrier, an endless brush-belt arranged within the endless carrier below the picking-screen, distending and driving rolls for the endless brush-belt and means for regulating the tension of the brush-belt, substantially as described.

FINTON F. FERGUSON.
JESSE T. BENTHALL.

Witnesses:
E. B. HILL,
JOHN B. TRADER.

---

Correction in Letters Patent No. 808,442.

It is hereby certified that Letters Patent No. 808,442, granted December 26, 1905, upon the application of Finton F. Ferguson and Jesse T. Benthall, of Murfreesboro, North Carolina, for an improvement in "Peanut-Pickers," was erroneously issued to Richard T. Barnes, as owner of the entire interest in said invention; that said Letters Patent should have been issued to the inventor Jesse T. Benthall and Richard T. Barnes, *jointly*, said Richard T. Barnes being the assignee of Finton F. Ferguson's one-half interest only in said patent as shown by the record of assignment in this office; and that the said Letters Patent should be read with this correction therein that the same may conform to the record of the case in the Patent Office.

Signed and sealed this 16th day of January, A. D., 1906.

[SEAL.]

F. I. ALLEN,
*Commissioner of Patents.*

Correction in Letters Patent No. 808,442.

It is hereby certified that Letters Patent No. 808,442, granted December 26, 1905, upon the application of Finton F. Ferguson and Jesse T. Benthall, of Murfreesboro, North Carolina, for an improvement in "Peanut-Pickers," was erroneously issued to Richard T. Barnes, as owner of the entire interest in said invention; that said Letters Patent should have been issued to the inventor Jesse T. Benthall and Richard T. Barnes, *jointly*, said Richard T. Barnes being the assignee of Finton F. Ferguson's one-half interest only in said patent as shown by the record of assignment in this office; and that the said Letters Patent should be read with this correction therein that the same may conform to the record of the case in the Patent Office.

Signed and sealed this 16th day of January, A. D., 1906.

[SEAL.]

W. W. Mortimer
Chief Div. B.

F. I. ALLEN,
*Commissioner of Patents.*